US006800264B1

(12) United States Patent
Askew et al.

(10) Patent No.: US 6,800,264 B1
(45) Date of Patent: Oct. 5, 2004

(54) PROCESS FOR STABILIZING AQUEOUS ALUMINATE AND ZIRCONATE SOLUTIONS

(75) Inventors: Timothy Edward Askew, Baltimore, MD (US); Jasbir Singh Kumar, Fallston, MD (US); Brain Thomas Lenkowski, North Bennington, VT (US); Matthew Allen Franczak, Woodstock, MD (US)

(73) Assignee: United States Aluminate Company, Baltimore, MD (US)

( * ) Notice: Subject to any disclaimer, the term of this patent is extended or adjusted under 35 U.S.C. 154(b) by 354 days.

(21) Appl. No.: 10/123,700

(22) Filed: Apr. 16, 2002

Related U.S. Application Data

(60) Provisional application No. 60/287,078, filed on Apr. 27, 2001.

(51) Int. Cl.$^7$ ............................. C01F 7/00; C01G 25/00
(52) U.S. Cl. ................... 423/275; 423/594.12; 423/600
(58) Field of Search ................................ 423/275, 265, 423/594.12, 600

(56) References Cited

U.S. PATENT DOCUMENTS

| 2,165,187 A | 7/1939 | Wilson et al. ................. 23/52 |
| 3,656,889 A | 4/1972 | Olewinski ....................... 23/52 |
| 4,007,252 A | 2/1977 | Burroughs .................. 423/265 |
| 4,261,958 A | 4/1981 | Pevzner et al. ............. 423/121 |
| 5,093,132 A | 3/1992 | Makino et al. ............. 424/475 |

*Primary Examiner*—Steven Bos
(74) *Attorney, Agent, or Firm*—Martin F. Sloan

(57) ABSTRACT

Use of alkali metal carbonates to stabilize aqueous solutions of alkali metal aluminates.

29 Claims, No Drawings

PROCESS FOR STABILIZING AQUEOUS ALUMINATE AND ZIRCONATE SOLUTIONS

This application claims priority from U.S. Provisional Application No. 60/287,078, filed Apr. 27, 2001, which is hereby incorporated by reference in its entirety.

FIELD OF THE INVENTION

This invention relates to processes for stabilizing aqueous solutions of alkali metal aluminates and zirconates.

BACKGROUND OF THE INVENTION

Alkali metal aluminates and zirconates, particularly sodium and potassium aluminates and zirconates, have a wide variety of commercial uses. They are employed in large amounts, e.g., in the manufacture of paper, in the purification of water, in the manufacture of catalysts and in the surface treatment of titanium dioxide. For many of these uses aqueous solutions of the aluminates and zirconates are preferred, and consequently large quantities of these solutions are used in commerce. A disadvantage of these aqueous solutions has been that they are not stable to long term storage at ambient temperatures. This is evidenced by the precipitation of solids, which cannot readily be put back into solution. This instability is generally made worse by the presence of iron and other heavy metal contaminants.

Organic compounds such as gluconic acid and tartaric acid have been used to stabilize aluminate and zirconate solutions, and U.S. Pat. No. 3,656,889, which is incorporated by reference herein in its entirety, discloses the use of a synergistic blend of tartaric and gluconic acids to stabilize sodium aluminate solutions. However, there are applications, e.g., acceleration of the setting of concrete with potassium aluminate, catalyst manufacture and surface treatment of titanium dioxide, where the presence of tataric and gluconic acids is undesirable.

For this reason, there is a need in the industry for a method of stabilizing alkali metal aluminate and zirconate solutions without the use of organic stabilizing agents such as gluconates or tartrates.

SUMMARY OF THE INVENTION

This invention relates to a process of stabilizing an aqueous solution of alkali metal aluminate or zirconate comprising adding to the solution an alkali metal carbonate in an amount sufficient to prevent precipitation of solids from the solution for at least about 3 months at 15–25° C. In another embodiment the invention relates to a process of stabilizing an aqueous alkali metal aluminate solution comprising adding to the solution an alkali metal carbonate in an amount sufficient to prevent precipitation of solids from the solution for at least about 3 months, wherein the solution contains no alkali metal salts of organic acids having greater than 1 carbon atom.

DETAILED DESCRIPTION OF THE INVENTION

The object of this invention is a method for stabilizing aqueous solutions of alkali metal aluminates or zirconates, preferably aluminates. Aluminates are alkaline aqueous solutions usually manufactured from alumina trihydrate ($Al_2O_3 \cdot 3\ H_2O$) and alkali metal hydroxide. The operable alkali metals are selected from the group consisting of lithium, sodium, potassium, rubidium, cesium and francium. The preferred alkali metals are sodium and potassium. The most preferred alkali metal is sodium.

In the absence of stabilization, alkali metal aluminate and zirconate solutions tend to be unstable as evidenced by the precipitation of solid matter upon standing, or gradually increasing turbidity. It is generally believed that any solid matter in a solution of aluminate or zirconate will act as a site to promote crystal growth. Consequently efficient filtering of finished products is essential. The materials that initiate precipitation from aluminate solutions are believed to be insoluble oxides and hydroxides such as alkaline earth and transition metal oxides and hydroxides. These may result from impurities in the alumina trihydrate or alkali metal hydroxides, or may develop from contaminants encountered during transportation or storage of the aluminate or zirconate products. Because the solubility of the alkaline earth and transition metal oxides and hydroxides generally decreases as the solutions cool, organic chelating agents, e.g. gluconate, tartrate, are often added to chelate or irreversibly bond with the positive ions that lead to insoluble metal oxides and hydroxides.

The present invention achieves stability without the necessity of adding these organic chelating agents. Stability is achieved by addition to the aluminate solutions alkali metal carbonate, selected from the group consisting of lithium carbonate, sodium carbonate, potassium carbonate, rubidium carbonate, cesium carbonate and francium carbonate. Preferred carbonates are sodium and potassium carbonates. The carbonate, which may be added to the aluminate or zirconate solution as an aqueous solution or as a solid, is preferably added at a level of at least about 0.05 wt. % based on the weight of the final solution. More preferably it is added at a level of at least about 0.1 wt. %, and most preferably at a level of at least about 0.2 wt. %. With regard to the maximum level of carbonate, preferably it is no greater than about 10 wt. %, more preferably no greater than about 5 wt. %, and most preferably no greater than about 1 wt. %, based on the weight of the final solution.

It is conventional commercial practice to calculate the concentration of aluminate solutions expressed in terms of the concentration of an equivalent amount of $Al_2O_3$. The minimum aluminate concentration expressed as $Al_2O_3$ for the solutions stabilized by the method of the invention is not critical and can be very dilute, e.g. 0.1 wt. %. Preferably the aqueous solutions contain from about 5 to about 50 wt. % $Al_2O_3$, and more preferably 15 to 30 wt. % $Al_2O_3$, and most preferably from about 20 to about 30 wt. % $Al_2O_3$. Conventionally stabilized all metal aluminate solutions generally contain a maximum of level of about 25–26 wt. % $Al_2O_3$, because higher levels lead to long-term instability even in the presence of organic chelating agents such as tartrate or gluconate.

Aluminate or zirconate solutions stabilized by the methods of this invention can remain stable against development of precipitation or cloudiness for at least about 3 months. Preferably the solutions are stable for at least about 6 months, and more preferably for at least about 1 year when stored at conventional room temperatures, i.e., 15–25° C. It should be noted that temperatures substantially lower than this range are deleterious to stability. However, it is found that in the case of alkali metal aluminate solutions, carbonate acts to reduce the temperature sensitivity of the solutions, enabling them to stay stable in situations where they might become colder than normal, such as outdoor storage in winter, and even enabling higher concentrations than are conventionally possible at room temperature by allowing concentrations that are only stable at elevated temperatures to remain stable after cooling.

Although, as indicated above, the benefits of the invention are achieved without the use of organic stabilizers containing more than 1 carbon atom, e.g. gluconate and tartrate, it has been found that the use of such organic stabilizers in conjunction with the carbonate stabilizers of this invention is not deleterious to stability. Consequently, in circumstances where such stabilizers are particularly desirable, they can be used together with carbonate stabilizer without inhibiting their effects.

While not wishing to be bound by any theory, it is believed that the alkali metal carbonate stabilizers of the invention prevent nucleating crystals from forming in two ways. First, since carbonates may be less soluble than hydroxides oxides of the contaminating metals, much of the metal may by precipitated out at higher temperatures when carbonate is added and removed in the filtration step. Second, the metal carbonates may not be as effective nucleators as oxides or hydroxides. It is also believed that carbonate may help stabilize aluminate and zirconate solutions by hindering neutralization of the solutions, particularly by absorption of carbon dioxide from the air upon storage. Solutions containing large quantities of carbonate ions will not as easily absorb carbon dioxide.

This invention is illustrated by the following examples, which are exemplary only and not intended to be limiting. Various modifications and variations can be made without departing from the scope of the appended claims. Unless otherwise stated, all part and percentages are by weight.

Procedures

Batches of liquid sodium aluminate for stability testing were prepared by the following procedure. Each batch was then split into separate samples, some stabilized with different concentrations of carbonate, some with gluconate (controls), and some left unstabilized (controls). Sodium hydroxide and water were added to a beaker or flask and brought to a temperature of 115° C., and then the necessary quantity of alumina trihydrate was added. After all of the alumina trihydrate was added and dissolved, the solution was boiled and then filtered. A sample was then removed to be retained as an unstabilized control. An additional sample was removed to which sodium gluconate was added at a level such that it was present at 0.05% wt. % of the sample. To a third sample of the original solution the desired amount of sodium carbonate was added for stabilization. The samples were then reboiled until all of the stabilizer had dissolved and then the resulting solutions were filtered.

Analysis for $Al_2O_3$ Content

The aluminate solutions were first treated with hydrochloric acid to reduce the pH and release $Al^{+3}$ ions. Then an excess of chelating agent, trans-(1,2-cyclohexylenedinitrilo)-tetracetic acid (CTDA) was added, followed by xylenol orange (indicator) and hexamethylenetetramine to buffer the solution to pH 5.5. The resulting solutions were then titrated with aqueous zinc sulfate solution until the indicator changed from yellow to violet indicating the completion of the reaction of excess CTDA with zinc. The aluminum ion concentration was then calculated from the difference between the amount of CTDA added and the amount available for reaction with $Zn^{++}$. The aluminum ion concentration was expressed as $Al_2O_3$.

Analysis for Alkalinity

The alkalinity of the samples, expressed as, for example sodium or potassium oxide, was determined by first adding barium chloride solution to a weighed sample to precipitate carbonate. Then sodium tartrate solution was added to complex with excess barium ion. The resulting samples were then titrated with dilute HCl to the phenolphthalein endpoint. The % $Na_2O$ or $K_2O$ was then calculated from the milliequivalents of hydrochloric acid utilized.

Stability Testing

The stability of samples was assessed on the basis of the level of turbidity that developed upon storage at room temperature. Turbidity was measured on a ranking scale of 1 to 5 with the following criteria.

| Turbidity Number | Solution Description |
|---|---|
| 1 | Solution remains stable and clear |
| 2 | Solution is slightly cloudy but can still be easily seen through the solution |
| 3 | Solution is cloudy, but shapes and contrasts can still be seen through the solution |
| 4 | Solution is opaque |
| 5 | Material has precipitated along the bottom of the sample |

Ratings of 1 and 2 were considered to be stable products. A ratings of 3 was considered marginally satisfactory, and a rating of 4 or above failure, i.e. commercially unusable.

EXAMPLES 1–5

These examples compare stability results for compositions containing no stabilizer, sodium gluconate stabilizer and sodium carbonate stabilizer. In order to more closely simulate actual commercial experience, the samples of Examples 1–5 were opened to the air and shaken for 10 seconds each three times a week. The results are presented in Table 1. Examples 1–4 demonstrate that use of sodium carbonate at the 1% level stabilizes the aluminate solutions relative to the use of no stabilizer. The results of Example 5 indicate that at extraordinarily high aluminate levels, such as 29% $Al_2O_3$, a lower level of sodium carbonate than 1% is a more effective stabilizer.

TABLE 1

| | | | | Turbidity After: | | | | | | |
|---|---|---|---|---|---|---|---|---|---|---|
| Example No. | % $Al_2O_3$ | % $Na_2O$ | Stabilizer | As Made | 30 days | 60 days | 90 days | 120 days | 150 days | 180 days |
| 1 | 25.5 | 19.5 | None | | | | | | | |
| | | | 1% $Na_2CO_3$ | 2 | 2 | 2 | 3 | 4 | 4 | 4 |
| | | | 0.05% Sodium gluconate | 1 | 1 | 2 | 2 | 3 | 3 | 4 |

TABLE 1-continued

| Example No. | % Al$_2$O$_3$ | % Na$_2$O | Stabilizer | Turbidity After: | | | | | | |
|---|---|---|---|---|---|---|---|---|---|---|
| | | | | As Made | 30 days | 60 days | 90 days | 120 days | 150 days | 180 days |
| 2 | 26.5 | 19 | None | 2 | 2 | | 5 | 5 | 5 | |
| | | | 1% Na$_2$CO$_3$ | 2 | 2 | | 3 | 3 | 3 | 4 |
| | | | 0.05% Sodium gluconate | 1 | 1 | | 4 | 4 | 4 | 5 |
| 3 | 26 | 19.5 | None | 1 | 2 | | 3 | 3 | 3 | 3 |
| | | | 1% Na$_2$CO$_3$ | 2 | 2 | | 2 | 2 | 2 | 2 |
| | | | 0.05% Sodium gluconate | 1 | 1 | | 1 | 1 | 1 | 1 |
| 4 | 27.5 | 19 | None | 2 | 3 | | 4 | 5 | 5 | 5 |
| | | | 1% Na$_2$CO$_3$ | 2 | 3 | | 4 | 4 | 4 | 4 |
| | | | 0.05% Sodium gluconate | 1 | 1 | | 1 | 1 | 2 | 2 |
| 5 | 29 | 20.5 | None | 3 | 3 | | 4 | 4 | 4 | 4 |
| | | | 1% Na$_2$CO$_3$ | 3 | 3 | | 4 | 4 | 4 | 4 |
| | | | 0.5% Na$_2$CO$_3$ | 2 | 3 | | 3 | 3 | 3 | 3 |
| | | | 0.05% Sodium gluconate | 1 | 1 | | 2 | 2 | 2 | 2 |

EXAMPLES 6–8

Examples 6–8 are an attempt to simulate conditions that might be encountered in storage tanks, when sodium aluminate solutions are pumped into tanks at high temperatures. Samples were prepared as described above. Approximately 50 ml portions of the samples were treated with 2.5 ml of boiling tap water. The results are presented in Table 2–4. The results in these tables indicate that under these conditions sodium carbonate performs more effectively as a stabilizer than does sodium gluconate.

TABLE 2

Example 6
25.75% Al$_2$O$_3$, 19.1% Na$_2$O

| Stabilizer | Turbidity After: | | | | | |
|---|---|---|---|---|---|---|
| | As Made | 1 Weeks | 2 Weeks | 6 Weeks | 7 Weeks | 8 Weeks |
| None | 1 | | | 2 | 2 | 2 |
| 0.05% Sodium gluconate | 1 | 2 | 3 | 4 | 4 | 4 |
| 0.2% Na$_2$CO$_3$ | 1 | 1 | 2 | 2 | 2 | 2 |
| 0.4% Na$_2$CO$_3$ | 1 | | 1 | 2 | 2 | 2 |
| 0.6% Na$_2$CO$_3$ | 1 | | 2 | 3 | 3 | 3 |
| 0.8% Na$_2$CO$_3$ | 1 | 2 | 2 | 3 | 3 | 3 |

TABLE 3

Example 7
27.5% Al$_2$O$_3$, 20.5% Na$_2$O

| Stabilizer | Turbidity After: | | | | | |
|---|---|---|---|---|---|---|
| | As Made | 1 Weeks | 2 Weeks | 6 Weeks | 7 Weeks | 8 Weeks |
| None | 1 | 2 | 3 | 4 | 5 | 5 |
| 0.05% Sodium gluconate | 1 | 2 | 3 | 5 | 5 | 5 |
| 0.2% Na$_2$CO$_3$ | 1 | 2 | 3 | 4 | 4 | 4 |
| 0.4% Na$_2$CO$_3$ | 1 | 1 | 2 | 3 | 3 | 3 |
| 0.6% Na$_2$CO$_3$ | 1 | 2 | 2 | 3 | 3 | 3 |
| 0.8% Na$_2$CO$_3$ | 1 | 2 | 3 | 3 | 3 | 3 |

TABLE 4

Example 8
26.65% Al$_2$O$_3$, 20.1% Na$_2$O

| Stabilizer | Turbidity After | | |
|---|---|---|---|
| | As Made | 7 Days | 14 Days |
| None | 1 | | 3 |
| 0.05% Sodium gluconate | 1 | 4 | 5 |
| 0.1% Na$_2$CO$_3$ | 1 | 4 | 5 |
| 0.2% Na$_2$CO$_3$ | 1 | 1 | 2 |
| 0.3% Na$_2$CO$_3$ | 1 | 2 | 3 |
| 0.4% Na$_2$CO$_3$ | 1 | 1 | 2 |
| 0.7% Na$_2$CO$_3$ | 1 | 2 | 3 |

What is claimed is:

1. A process of stabilizing an aqueous solution of alkali metal aluminate or alkali metal zirconate comprising adding to the solution an alkali metal carbonate in an amount sufficient to prevent precipitation of solids from the solution for at least about 3 months at 15–25° C.

2. The process of claim 1 wherein the precipitation of solids is prevented for at least about 6 months.

3. The process of claim 1 wherein the precipitation of solids is prevented for at least about 1 year.

4. The process of claim 1 wherein the alkali metal is selected from the group consisting of lithium, sodium, potassium, rubidium, cesium and francium.

5. The process of claim 1 wherein the aqueous solution comprises an aqueous solution of sodium aluminate.

6. The process of claim 1 wherein the aqueous solution comprises an aqueous solution of potassium aluminate.

7. The process of claim 1 wherein the aqueous h solution comprises an aqueous solution of sodium zirconate.

8. The process of claim 1 wherein the aqueous solution comprises an aqueous solution of potassium zirconate.

9. The process of claim 1 wherein the alkali metal carbonate is selected from the group consisting of lithium carbonate, sodium carbonate, potassium carbonate, rubidium carbonate, cesium carbonate and francium carbonate.

10. The process of claim 1 wherein the alkali metal carbonate is sodium carbonate.

11. The process of claim 1 wherein the alkali metal carbonate is potassium carbonate.

12. The process of claim 1 wherein the alkali metal carbonate is added in aqueous solution.

13. The process of claim 1 wherein the alkali metal carbonate is added as a solid.

14. The process of claim 1 wherein the solution is alkali metal aluminate and the solution contains from 5 to 50 wt. % aluminate expressed as percent $Al_2O_3$.

15. The process of claim 1 wherein the solution is alkali metal aluminate and the solution contains from 15 to 30 wt. % aluminate expressed as percent $Al_2O_3$.

16. The process of claim 1 wherein the solution is alkali metal aluminate and the solution contains from 20 to 30 wt. % aluminate expressed as percent $Al_2O_3$.

17. The process of claim 1 wherein the solution is alkali metal aluminate and the solution contains greater than about 25 wt. % aluminate expressed as percent $Al_2O_3$.

18. The process of claim 1 wherein the alkali metal carbonate is added at a level of from about 0.05 to about 10 wt. % based on the weight of the final solution.

19. The process of claim 1 wherein the alkali metal carbonate is added at a level of from about 0.1 to about 5 wt. % based on the weight of the final solution.

20. The process of claim 1 wherein the alkali metal carbonate is added at a level of from about 0.2 to about 1 wt. % based on the weight of the final solution.

21. The process of claim 1 wherein no additional organic stabilizers are added to the aqueous solution.

22. The process of claim 1 further comprising adding to the aqueous solution gluconic acid or an alkali metal salt thereof.

23. The process of claim 1 further comprising adding to the aqueous solution tartaric acid or an alkali metal salt thereof.

24. The process of claim 1 wherein the alkali metal aluminate is selected from the group consisting of sodium aluminate and potassium aluminate, the alkali metal carbonate is selected from the group consisting of sodium carbonate and potassium carbonate.

25. The process of claim 24 wherein the alkali metal aluminate is sodium aluminate, the alkali metal carbonate is sodium carbonate, the alkali metal aluminate solution contains from 5 to 50 wt. % aluminate expressed as percent $Al_2O_3$, the sodium carbonate is added at a level of from about 0.05 to about 10 wt. % based on the weight of the final solution and the precipitation of solids is prevented for at least about 3 months at 15–25° C.

26. The process of claim 24 wherein the alkali metal aluminate is potassium aluminate, the alkali metal carbonate is potassium carbonate, the alkali metal aluminate solution contains from 5 to 50 wt. % aluminate expressed as percent $Al_2O_3$, the potassium carbonate is added at a level of from about 0.05 to about 10 wt. % based on the weight of the final solution and the precipitation of solids is prevented for at least about 3 months at 15–25° C.

27. The process of claim 23 wherein the precipitation of solids is prevented for at least about 6 months.

28. The process of claim 23 wherein the precipitation of solids is prevented for at least about 1 year.

29. A process of stabilizing an aqueous alkali metal aluminate solution comprising adding to the solution an alkali metal carbonate in an amount sufficient to prevent precipitation of solids from the solution for at least about 3 months, wherein the solution contains no alkali metal salts of organic acids having greater than 1 carbon atom.

\* \* \* \* \*